US012019158B2

(12) United States Patent
Otani et al.

(10) Patent No.: US 12,019,158 B2
(45) Date of Patent: Jun. 25, 2024

(54) DISTANCE-MEASURING IMAGING DEVICE AND SOLID-STATE IMAGING ELEMENT

(71) Applicant: NUVOTON TECHNOLOGY CORPORATION JAPAN, Kyoto (JP)

(72) Inventors: Mitsuhiko Otani, Osaka (JP); Seiji Nakamura, Osaka (JP); Keiichi Mori, Osaka (JP)

(73) Assignee: NUVOTON TECHNOLOGY CORPORATION JAPAN, Kyoto (JP)

( * ) Notice: Subject to any disclaimer, the term of this patent is extended or adjusted under 35 U.S.C. 154(b) by 783 days.

(21) Appl. No.: 17/194,127

(22) Filed: Mar. 5, 2021

(65) Prior Publication Data

US 2021/0190955 A1 Jun. 24, 2021

Related U.S. Application Data

(63) Continuation of application No. PCT/JP2019/035218, filed on Sep. 6, 2019.

(Continued)

(51) Int. Cl.
*G01S 17/89* (2020.01)
*G01S 7/481* (2006.01)
(Continued)

(52) U.S. Cl.
CPC .............. *G01S 17/89* (2013.01); *G01S 7/4816* (2013.01); *G01S 7/484* (2013.01); *H04N 25/587* (2023.01); *H04N 25/705* (2023.01); *H04N 25/75* (2023.01)

(58) Field of Classification Search
CPC ........ G01S 17/89; G01S 7/4816; G01S 7/484; G01S 7/4865; G01S 17/894;
(Continued)

(56) References Cited

U.S. PATENT DOCUMENTS 9,584,105 B1    2/2017  Foley
10,048,356 B2 *  8/2018  Takano ................... G01S 17/10
(Continued)

FOREIGN PATENT DOCUMENTS

JP    2005-069927 A    3/2005
JP    2016-095298 A    5/2016
(Continued)

OTHER PUBLICATIONS

International Search Report and Written Opinion issued in International Patent Application No. PCT/JP2019/035218, dated Dec. 3, 2019; with partial English translation.

*Primary Examiner* — Seung C Sohn
(74) *Attorney, Agent, or Firm* — Rimon P.C.

(57) ABSTRACT

A distance-measuring imaging device includes: a controller which repeatedly performs outputting of an emission signal instructing light emission and outputting of an exposure signal instructing exposure; a light source unit which performs light emission a plurality of times in accordance with the emission signal repeatedly outputted by the controller; and an imaging unit which includes a solid-state imaging element for performing exposure a plurality of times in accordance with the exposure signal repeatedly outputted by the controller and which generates an imaging signal through the exposure performed the plurality of times.

10 Claims, 8 Drawing Sheets

Related U.S. Application Data

(60) Provisional application No. 62/729,957, filed on Sep. 11, 2018.

(51) Int. Cl.
  *G01S 7/484* (2006.01)
  *H04N 25/587* (2023.01)
  *H04N 25/705* (2023.01)
  *H04N 25/75* (2023.01)

(58) Field of Classification Search
  CPC .. G01S 7/4863; H04N 25/587; H04N 25/705; H04N 25/75
  See application file for complete search history.

(56) References Cited

U.S. PATENT DOCUMENTS

| | | |
|---|---|---|
| 10,250,243 B2 * | 4/2019 | Lee .................. H03K 5/15033 |
| 2003/0235260 A1 | 12/2003 | Nakamura et al. |
| 2016/0116576 A1 | 4/2016 | Barnes |
| 2016/0365846 A1 | 12/2016 | Wyland |
| 2018/0053799 A1 | 2/2018 | Otani et al. |
| 2019/0383917 A1 | 12/2019 | Shinozuka |

FOREIGN PATENT DOCUMENTS

| | | |
|---|---|---|
| WO | 2016/189808 A1 | 12/2016 |
| WO | 2019/123738 A1 | 6/2019 |

* cited by examiner

DISTANCE-MEASURING IMAGING DEVICE AND SOLID-STATE IMAGING ELEMENT

CROSS REFERENCE TO RELATED APPLICATIONS

This application is a U.S. continuation application of PCT International Patent Application Number PCT/JP2019/035218 filed on Sep. 6, 2019, claiming the benefit of priority of U.S. Provisional Patent Application No. 62/729,957 filed on Sep. 11, 2018, the entire contents of which are hereby incorporated by reference.

BACKGROUND

1. Technical Field

The present disclosure relates to a distance-measuring imaging device and a solid-state imaging element.

2. Description of the Related Arts

Of a plurality of methods for detecting an object, a time of flight (TOF) method for performing distance measurement by use of flight time for which light reciprocates to and from a measurement target object is known.

Japanese Unexamined Patent Application Publication No. 2016-95298 discloses a technology of actively compensating a measured distance difference attributable to a phase difference between emission driving of a light source and exposure driving of an imaging unit provided following a state change of a camera due to a temperature and time passage based on phase comparison between a real driving pulse of an emission and exposure driver of the light source and a reference pulse.

SUMMARY

However, in the technology disclosed in Japanese Unexamined Patent Application Publication No. 2016-95298, the phase difference between the emission timing of the light source and the exposure timing of the imaging unit due to a variation in driving control circuits which generate the reference pulse, a temperature change, and deterioration over time are not corrected. Thus, in distance-measuring camera calibration for determining a coefficient upon conversion of a measured depth value into a real distance value, a subject (measurement target object) is fixed, and upon controlling the driving control circuit to perform calibration of scanning either one of the emission timing of the light source and the exposure timing of the imaging unit to virtually vary a distance, there arises a problem that a difference arises in the virtual distance change and the accuracy of the calibration consequently deteriorates, which leads to a deterioration in the distance measurement accuracy.

Thus, it is an object of the present disclosure to provide a distance-measuring imaging device and a solid-state imaging element capable of suppressing a deterioration in distance measurement accuracy attributable to a phase difference between emission timing and exposure timing.

A distance-measuring imaging device according to one aspect of the present disclosure includes: a controller which repeatedly performs outputting of an emission signal instructing light emission and outputting of an exposure signal instructing exposure; a light source unit which performs light emission a plurality of times in accordance with the emission signal repeatedly outputted by the controller; and an imaging unit which includes a solid-state imaging element which performs exposure a plurality of times in accordance with the exposure signal repeatedly outputted by the controller and which generates an imaging signal through the exposure performed the plurality of times, wherein the controller includes a multi-phase delay signal generation circuit which generates a plurality of delay clocks having mutually different phases, and uses the plurality of delay clocks to repeatedly perform the outputting of the emission signal and the outputting of the exposure signal.

The controller may update phase setting sequentially used from among two or more phase settings for setting a phase difference between output timing of the emission signal and output timing of the exposure signal with reference to a basic clock.

Where the two or more phase settings are respectively defined as first to k-th phase settings in ascending order of a phase difference between the basic clock and the outputting timing of the exposure signal where k is an integer of 2 or more, for the k desired, a phase difference between the outputting timing of the exposure signal in a k−1-th phase setting and the outputting timing of the exposure signal in the k-th phase setting may be one k-th of one cycle of the basic clock.

The controller may use one of the two or more phase settings to perform a first set of repeatedly performing the outputting of the emission signal and the outputting of the exposure signal a plurality of times, and may use another one of the two or more phase settings to perform a second set of repeatedly performing the outputting of the emission signal and the outputting of the exposure signal a plurality of times equal to the plurality of times which the first set is performed.

The controller may update the phase setting sequentially used in one frame of an exposure period.

The controller may update the phase setting sequentially used upon switching of exposure periods having mutually different frames.

The controller may maintain a relative phase relation between the outputting timing of the emission signal and the outputting timing of the exposure signal in repeatedly performing the outputting of the emission signal and the outputting of the exposure signal a plurality of times, and the controller may further update, from among the two or more phase settings having the relative phase relation that is identical, the phase setting sequentially used.

The multi-phase delay signal generation circuit may be a DLL circuit.

The multi-phase delay signal generation circuit may include: a variable delay circuit which sequentially delays the basic clock and generates the plurality of delay clocks; a phase comparison circuit which receives input of a first reference clock as any one of the plurality of delay clocks or the basic clock and a second reference clock as any one of the plurality of delay clocks a phase of which is behind a phase of the first reference clock, and compares the phase of the first reference clock and the phase of the second reference clock within one cycle of the basic clock based on voltage levels of the first reference clock and the second reference clock; a delay control circuit which controls a delay amount in the sequential delaying of the basic clock in the variable delay circuit based on a result of comparison performed by the phase comparison circuit; and a selection circuit which, from among the plurality of delay clocks generated by the variable delay circuit, selects and outputs one or more delay clocks.

A calculator which outputs a distance signal including information on a distance to a subject based on the imaging signal may be further included.

The solid-state imaging element may include a pixel array including a plurality of pixels arranged in a matrix, each of the plurality of pixels may include: a photoelectric converter which converts received light into electric charges; and a reading gate which reads the electric charges resulting from the conversion by the photoelectric converter, and the pixel array may include, for each column, a vertical transfer unit which transfers, in a direction along the column, the electric charges read by the reading gate.

A solid-state imaging element according to another aspect of the present disclosure is included in an imaging unit of a distance-measuring imaging device including: a controller, a light source unit, and the imaging unit, and the solid-state imaging element may perform exposure a plurality of times in accordance with an exposure signal repeatedly outputted by the controller, wherein the controller repeatedly performs outputting of an emission signal instructing light emission and outputting of an exposure signal instructing exposure, includes a multi-phase signal generation circuit which generates a plurality of delay clocks having mutually different phases, and uses the plurality of delay clocks to repeatedly perform the outputting of the emission signal and the outputting of the exposure signal, the light source unit performs light emission a plurality of times in accordance with the emission signal repeatedly outputted by the controller, the imaging unit generates an imaging signal.

With the distance-measuring imaging device and the solid-state imaging element according to the aspects of the present disclosure, it is possible to suppress distance measurement accuracy deterioration attributable to a phase difference between emission timing and exposure timing.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

DETAILED DESCRIPTION OF THE EMBODIMENT

Hereinafter, a distance-measuring imaging device and a solid-state imaging element used therefor according to an embodiment of the present disclosure will be described with reference to the drawings. Note that each embodiment illustrates one detailed example of the present disclosure, and numerical values, shapes, materials, components, arrangement positions and connection modes of the components, etc. each form one example but do not limit the present disclosure.

Moreover, an unnecessarily detailed description may be omitted. For example, a detailed description of already well-known matters and an overlapping description of substantially same configurations may be omitted. The omissions is done for the purpose of avoiding unnecessary redundancy in the descriptions below for easier understanding for those skilled in the art.

EMBODIMENT

Figure 1:
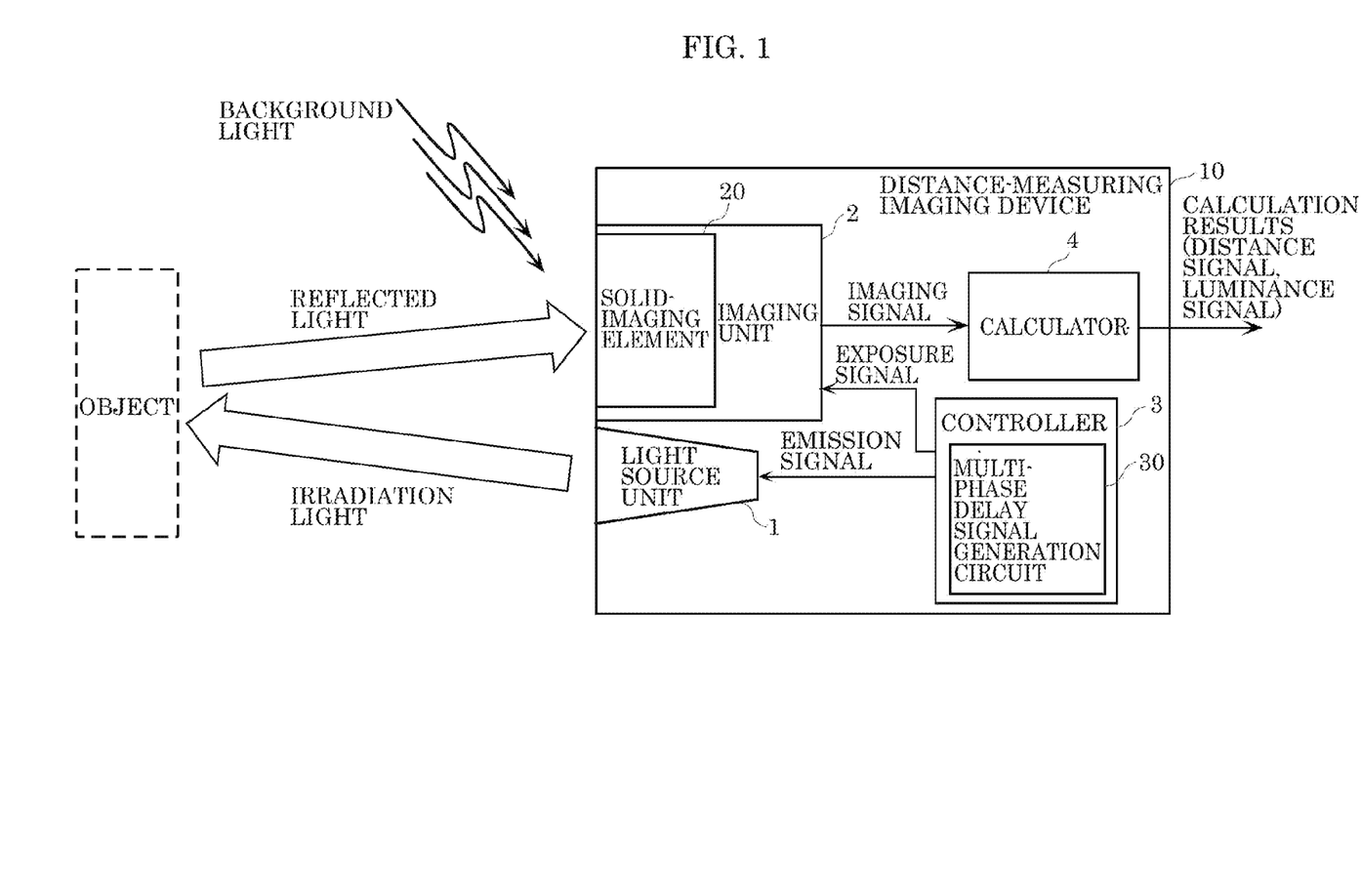
FIG. 1 is a functional block diagram illustrating one example of a configuration of a distance-measuring imaging device according to an embodiment.

FIG. 1 is a functional block diagram illustrating one example of a configuration of a distance-measuring imaging device according to the embodiment.

As illustrated in FIG. 1, distance-measuring imaging device 10 includes light source unit 1, imaging unit 2, controller 3, and calculator 4. With this configuration, distance-measuring imaging device 10 is capable of imaging a still image and imaging a moving image.

Controller 3 repeatedly performs the outputting of an emission signal instructing light emission and the outputting of an exposure signal instructing exposure. Controller 3 has multi-phase delay signal generation circuit 30 which generates a plurality of delay clocks having mutually different phases. The plurality of delay clocks generated by multi-phase delay signal generation circuit 30 are used to perform the outputting of the emission signal and the outputting of the exposure signal. More specifically, controller 3 uses edges of the plurality of delay clocks to generate the edge of the emission signal generated and the edge of the exposure signal generated to thereby generate and output the emission signal and the exposure signal.

Light source unit 1 performs light emission a plurality of times in accordance with the emission signal repeatedly outputted by controller 3. Light source unit 1 has, for example, a driving circuit, a capacitor, and a light-emitting element, not illustrated. The driving circuit radiates irradiation light from a light-emitting element by use of energy stored in the capacitor in accordance with the emission signal to thereby perform the light emission. The light-emitting element may be realized by, for example, a laser diode, a vertical cavity surface emitting laser (VCSEL), or a light emitting diode (LED) or may be realized by another element. The irradiation light is, for example, infrared light. The infrared light here includes near infrared light and far infrared light.

Imaging unit 2 has solid-state imaging element 20 which performs exposure a plurality of times in accordance with the exposure signal repeatedly outputted by controller 3.

Solid-state imaging element 20 receives: reflected light obtained by reflection of the irradiation light, radiated from light source unit 1, on an object; and background light such as sun light.

Imaging unit 2 generates an imaging signal through the exposure performed the plurality of times by solid-state imaging element 20. Imaging unit 2 may further have, as appropriate: a camera lens; an optical band filter (band passage filter) through which only light with a wavelength close to the wavelength of the irradiation light radiated from light source unit 1 passes; and circuits such as an A/D converter.

Calculator 4 outputs a distance signal including information on a distance to an object as a subject based on the imaging signal generated by imaging unit 2. The distance signal is, for example, a distance image. Calculator 4 may output a luminance signal in addition to the distance signal.

Figure 2:
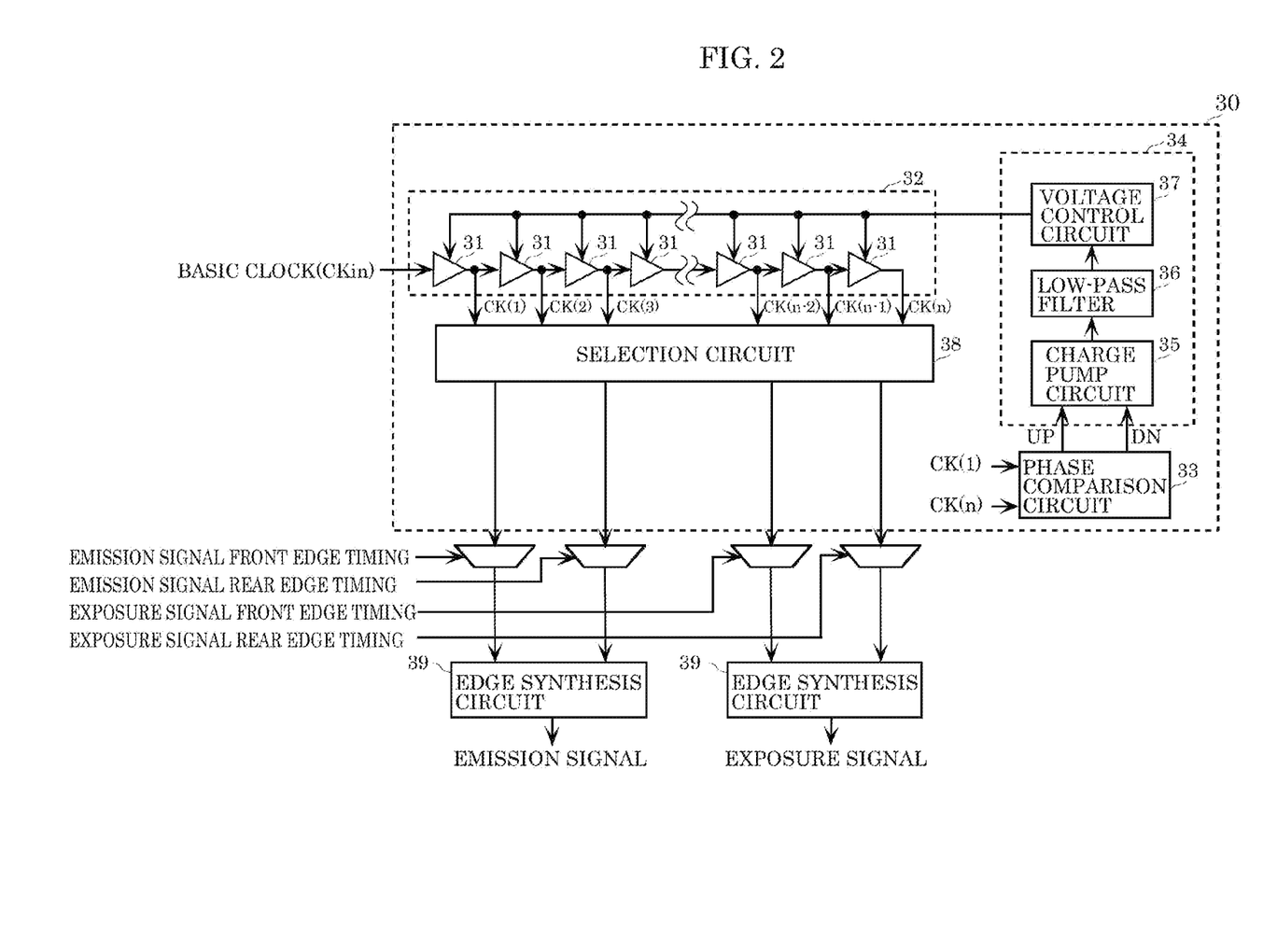
FIG. 2 is a functional block diagram illustrating one example of a configuration of a multi-phase delay signal generation circuit according to the embodiment.

FIG. 2 is a functional block diagram illustrating one example of a configuration of multi-phase delay signal generation circuit 30.

Here, a description is given under the assumption that multi-phase delay signal generation circuit 30 is a delay locked loop (DLL) circuit. However, as long as multi-phase delay signal generation circuit 30 can realize the same functions as the functions described below, multi-phase delay signal generation circuit 30 is not necessarily limited to an example as the DLL circuit. Multi-phase delay signal generation circuit 30 may be realized by, for example, a phase locked loop (PLL) circuit.

As illustrated in FIG. 2, multi-phase delay signal generation circuit 30 includes variable delay circuit 32, phase comparison circuit 33, delay control circuit 34, and selection circuit 38. Note that part of the circuits (edge separation circuit 51, variable shift register 52, phase comparator 53, delay adjustment circuit 56, etc., for all of which, refer to FIG. 5) illustrated in FIG. 5 to be described later on is omitted from illustration in FIG. 2 so as to avoid an excessively complicated description here. The circuits omitted from the aforementioned illustration will be described later on with reference to FIG. 5.

Variable delay circuit 32 sequentially delays a basic clock to generate a plurality of delay clocks having mutually different phases. More specifically, variable delay circuit 32 includes n (where n is an integer of 2 or more) delay elements 31 vertically connected, and sequentially delays a basic clock CKin inputted to generate n delay clocks CK (1), CK (2), . . . , CK (n). Where delay time in each of delay elements 31 is "Tp", delay time of delay clocks CK (1), CK (2), . . . , CK (n) are "Tp×1", "Tp×2", . . . , "Tp×n", respectively.

Phase comparison circuit 33 receives input of a first reference clock as any one of the delay clocks CK (n) or the basic clock CKin; and a second reference clock as any one of the delay clocks CK (n) whose phase is behind the phase of the first reference clock. Then phase comparison circuit 33 compares the phases of the first reference clock and the second clock within a range of one cycle of the basic clock CKin based on the voltage levels of the first reference clock and the second reference clock. Here, phase comparison circuit 33 receives input of the first delay clock CK (1) and the n-th delay clock CK (n) as the first reference clock and the second reference clock, respectively, compares the phases based on the respective voltage levels of the first reference clock, that is, the delay clock CK (1) and the second reference clock, that is, the CK (n), and outputs a charge signal UP or a discharge signal DN as a comparison result.

The charge signal UP is a signal causing charge pump circuit 35, to be described later on, to perform charge operation, which indicates that the phase of the delay clock CK (n) is behind the phase of delay clock CK (1).

On the other hand, the discharge signal DN is a signal causing charge pump circuit 35 to perform discharge operation, which indicates that the phase of the delay clock CK (n) is ahead of the phase of the delay clock CK (1).

Delay control circuit 34 controls the amount of delay in sequential delay of the basic clock CKin in variable delay circuit 32 based on an output result of phase comparison circuit 33.

Delay control circuit 34 includes charge pump circuit 35, low-pass filter 36, and voltage control circuit 37.

Charge pump circuit 35 raises or drops the output voltage outputted to low-pass filter 36 in response to the charge signal UP or the discharge signal DN outputted from phase comparison circuit 33.

Voltage control circuit 37 supplies the output voltage outputted from low-pass filter 36 to respective power supply terminals of n delay elements 31. Delay time in each delay element 31 increases with a decrease in the output voltage outputted from low-pass filter 36, and delay time in each delay element 31 decreases with an increase in the output voltage outputted from low-pass filter 36. As described above, as a result of controlling the voltage supplied to the power supply terminal of each delay element 31, the phases of the delay clock CK (1) and the delay clock CK (n) agree with each other, and delay time "Tp" becomes 1/n of one cycle of the basic clock CKin of the input.

Selection circuit 38 selects and outputs one or more delay clocks CK (n) from among the plurality of delay clocks CK (n) generated by variable delay circuit 32. More specifically, selection circuit 38 selects and outputs the delay clock CK (n) used for the phases of the front edge and the rear edge of each of the emission signal and the exposure signal from among n delay clocks CK (1), CK (2), . . . CK (n) outputted from variable delay circuit 32.

The logic of the delay clock CK (n) outputted from selection circuit 38 is incorporated with that of a front edge signal and a rear edge signal created at timing in one clock unit of the basic clock CKin by a logic circuit provided at a later state, and then the front edge of an emission reference signal, the rear edge of the emission reference signal, the front edge of an exposure reference signal, and the rear edge of the exposure reference signal are generated. Then the front edge and the rear edge of the emission reference signal and the front edge and the rear edge of the exposure reference signal are each inputted to edge synthesis circuit 39. Then both edges of the emission reference signal and the exposure reference signal are synthesized at respective edge synthesis circuits 39, and the emission signal and the exposure signal are outputted from respective edge synthesis circuits 39. Consequently, slight adjustment of the pulse width and the relative phase of the emission signal and the exposure signal can be performed in fine units of 1/n of one clock cycle of the basic clock CKin. Consequently, distance-measuring imaging device 10 can realize optimum distance resolution in a desired distance measurement range.

Controller 3 performs unit emission and exposure processing of outputting an emission signal and outputting an exposure signal while maintaining relative phase relation between the output timing of the emission signal and the output timing of the exposure signal.

Moreover, from among two or more phase settings for setting a phase difference between the output timing of the emission signal and the output timing of the exposure signal with reference to the basic clock CKin and having equal relative phase relation between the output timing of the emission signal and the output timing of the exposure signal, controller 3 updates the phase setting sequentially used to repeatedly perform the unit emission and exposure processing.

Figure 3:
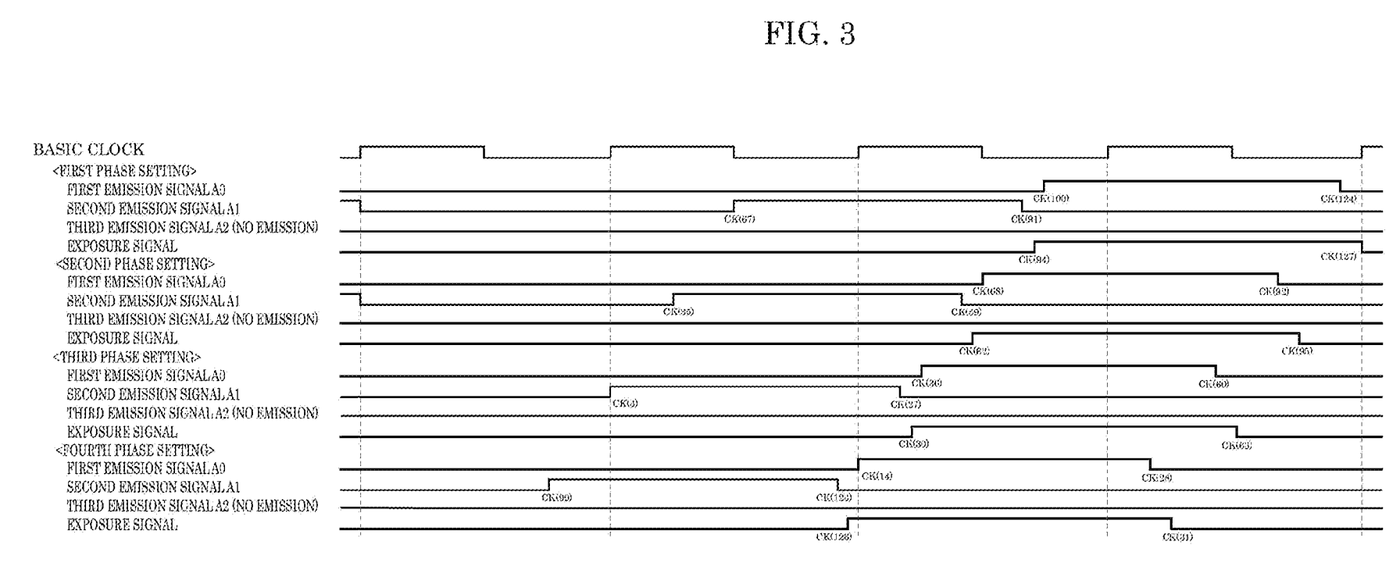
FIG. 3 is a timing chart illustrating one example of relative phase relation between timing of outputting an emission signal and timing of outputting an exposure signal in a unit emission and exposure processing according to the embodiment.

FIG. 3 is a timing chart illustrating one example of relative phase relation between the output timing of the emission signal and the output timing of the exposure signal in the unit emission and exposure processing.

The description provided here is based on the assumption that the total number of delay elements 31 vertically connected in variable delay circuit 32 is 128, each delay elements 31 sequentially delays the basic clock CKin to generate 128 delay clocks CK (1), CK (2), . . . , CK (128). The description here is also based on the assumption that the two or more phase settings are four phase settings including the first phase setting to the fourth phase setting.

Here, the unit emission and exposure processing refers to: processing of outputting a set of first emission signal A0 and the exposure signal; processing of outputting a set of second emission signal A1 and the exposure signal; and processing of outputting a set of third emission signal A2 and the exposure signal.

As illustrated in FIG. 3, in the first phase setting, first emission signal A0 as the emission signal in the first emission and exposure period uses delay clock CK (100) for the front edge and uses delay clock CK (124) for the rear edge, and second emission signal A1 as the emission signal in the second emission and exposure period uses delay clock CK (67) for the front edge and uses delay clock CK (91) for the rear edge. In the first phase setting, third emission signal A2 as the emission signal in the third emission and exposure period performs no light emission and is thus constantly at a low level, and the exposure signal uses delay clock CK (94) for the front edge and uses delay clock CK (127) for the rear edge over all of the first, second, and third emission and exposure periods.

In the second phase setting, first emission signal A0 as the emission signal in the first emission and exposure period uses delay clock CK (68) for the front edge and uses delay clock CK (92) for the rear edge, and second emission signal A1 as the emission signal in the second emission and exposure period uses delay clock CK (35) for the front edge and uses delay clock CK (59) for the rear edge. In the second phase setting, third emission signal A2 as the emission signal in the third emission and exposure period performs no light emission and is thus constantly at a low level, and the exposure signal uses delay clock CK (62) for the front edge and uses delay clock CK (95) for the rear edge over all of the first, second, and third emission and exposure periods.

In the third phase setting, first emission signal A0 as the emission signal in the first emission and exposure period uses delay clock CK (36) for the front edge and uses delay clock CK (60) for the rear edge, and second emission signal A1 as the emission signal in the second emission and exposure period uses delay clock CK (3) for the front edge and uses delay clock CK (27) for the rear edge. In the third phase setting, third emission signal A2 as the emission signal in the third emission and exposure period performs no light emission and is thus constantly at a low level, and the exposure signal uses delay clock CK (30) for the front edge and uses delay clock CK (63) for the rear edge over all of the first, second, and third emission and exposure periods.

In the fourth phase setting, first emission signal A0 as the emission signal in the first emission and exposure period uses delay clock CK (4) for the front edge and uses delay clock CK (28) for the rear edge, and second emission signal A1 as the emission signal in the second emission and exposure period uses delay clock CK (99) for the front edge and uses delay clock CK (123) for the rear edge. In the fourth phase setting, third emission signal A2 as the emission signal in the third emission and exposure period performs no light emission and is thus constantly at a low level, and the exposure signal uses delay clock CK (126) for the front edge and uses delay clock CK (31) for the rear edge over all of the first, second, and third emission and exposure periods.

As described above, there is provided equal relative phase relation between first emission signal A0, second emission signal A1, third emission signal A2, and the exposure signal in the first, second, third, and fourth phase settings. Moreover, the phase difference of first emission signal A0, the phase difference of second emission signal A1, the phase difference of third emission signal A2, and the phase difference of the exposure signal between the first phase setting and the second phase setting, between the second phase setting and the third phase setting, between the third phase setting and the fourth phase setting, and between the fourth phase setting and the first phase setting are all "Tp×32" as one fourth of one cycle of the basic clock CKin. That is, for a desired integer j of 2 to 4, the phase difference between the output timing of the exposure signal in the (j−1)-th phase setting and the output timing of the exposure signal in the j-th phase setting is one fourth of one cycle of the basic clock CKin.

Next, imaging operation of imaging one frame by distance-measuring imaging device 10 will be described.

Figure 4A:
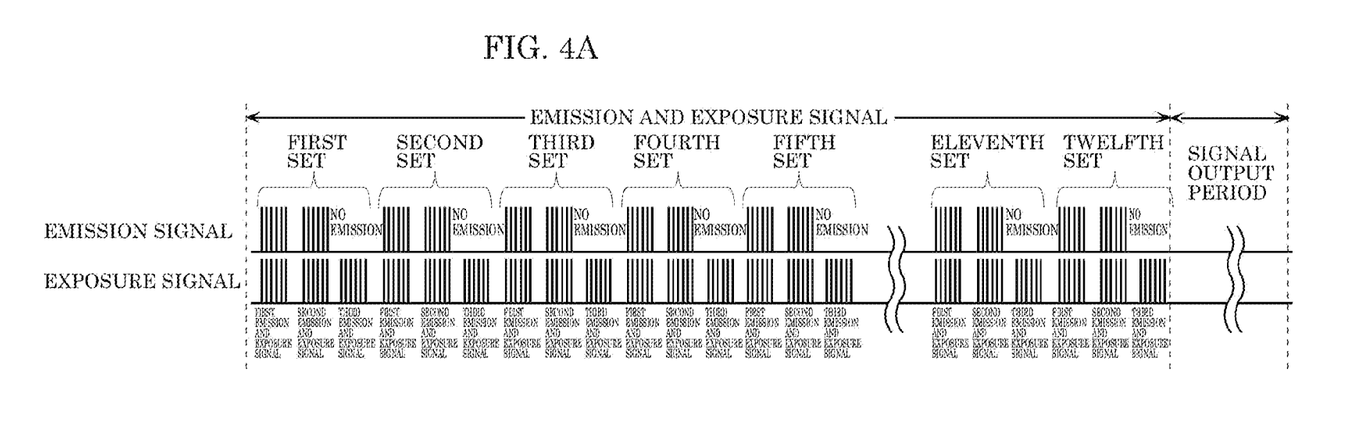
FIG. 4A is a timing chart illustrating one example of timing of the emission signal and the exposure signal in image sensing operation performed by the distance-measuring imaging device according to the embodiment.

FIG. 4A is a timing chart illustrating one example of timing of the emission signal and the exposure signal in the imaging operation performed by distance-measuring imaging device 10. In FIG. 4A, a horizontal axis indicates a time axis and a vertical axis indicates the signal levels of the emission signal and the exposure signal.

The emission signal is a positive logic digital signal having a pulse which instructs light emission. The emission signal instructs light source unit 1 to perform light emission at a high level and instructs light source unit 1 to perform no light emission at a low level.

The exposure signal is a positive logic digital signal having a pulse which instructs exposure. The exposure signal instructs solid-state imaging element 20 to perform exposure at a high level and instructs solid-state imaging element 20 to perform no exposure at a low level.

The operation of imaging one frame includes: N (where N is an integer of 2 or more) sets of emission and exposure processing; and one signal output processing. Assumed here is that N is 12.

In FIG. 4A, the emission and exposure period indicates a period in which the N sets of light emission and exposure processing are performed and a signal output processing period indicates a period in which signal output processing is performed once.

One set of emission and exposure processing includes first emission and exposure processing, second emission and exposure processing, and third emission and exposure processing. Moreover, each of the first emission and exposure processing, the second emission and exposure processing, and the third emission and exposure processing includes m (where m is an integer number of 1 or more) times of unit emission and exposure processing.

In the first emission and exposure processing, controller 3 outputs the emission signal and the exposure signal in each unit emission and exposure processing in a manner such that the exposure signal is behind the emission signal by first delay time. Moreover, in each unit emission and exposure processing, signal electric charges indicating the exposure amount are generated at each pixel, to be described later on, in solid-state imaging element 20, and the signal electric charges of each pixel generated are accumulated in one of a plurality of signal storage regions, to be described later on, which are formed for each pixel. The unit emission and exposure processing is repeated m times in the first emission and exposure processing.

In the second emission and exposure processing, controller 3 outputs the emission signal and the exposure signal in each unit emission and exposure processing in a manner such that the exposure signal is behind the emission signal by second delay time in each unit emission and exposure processing. Moreover, in each unit emission and exposure processing, signal electric charges indicating the exposure amount are generated at each pixel in solid-state imaging element 20, and the signal electric charges of each pixel generated are accumulated in one of the plurality of signal storage regions formed for each pixel. Here, the signal storage region where the signal electric charges are accumulated in the second emission and exposure processing is a signal storage region different from the signal storage region where the signal electric charges are accumulated in the first emission and exposure processing. The unit emission and exposure processing is repeated m times in the second emission and exposure processing.

In the third emission and exposure processing, controller 3 outputs the emission signal and the exposure signal in each unit emission and exposure processing in a manner such that the emission signal is not outputted and only the exposure signal is outputted. Moreover, in each unit emission and exposure processing, signal electric charges indicating the exposure amount are generated at each pixel in solid-state imaging element 20, and the signal electric charges of each pixel generated are accumulated in one of the plurality of signal storage regions formed for each pixel. The signal storage region where the signal electric charges are accumulated in the third emission and exposure processing is a signal storage region different from the signal storage region where the signal electric charges are accumulated in the first emission and exposure processing and the signal storage region where the signal electric charges are accumulated in the second emission and exposure processing. The unit emission and exposure processing is repeated m times in the third emission and exposure processing.

In operation of imaging one frame, the aforementioned one set of emission and exposure processing is repeated for 12 sets. Then after the 12 sets are repeated, the signal electric charges stored in each signal storage region of each pixel are read out. Then each of the signal electric charges read out is outputted to calculator 4.

The exposure period in the first emission and exposure processing and the exposure period in the second emission and exposure processing are determined so that solid-state imaging element 20 receives all reflected lights obtained through reflection of irradiation light radiated from light source unit 1 on the object in a period obtained by summing the exposure period in the first emission and exposure processing and the exposure period in the second emission and exposure processing. In this case, assumed is that the sum of the amounts of exposure through the first emission and exposure processing is A0, the sum of the amounts of exposure through the second emission and exposure processing is A1, the sum of the amounts of exposure through the third emission and exposure processing is A2, the pulse width (high-level period) of the emission signal is To, and the light speed (299, 792, 458 m/s) is C, calculator 4 can perform calculation of Equation 1 below to thereby calculate a distance L to the object.

[Math 1]

$$L = \frac{C \times To}{2} \times \frac{A1 - A2}{A0 - A2 + A1 - A2} \qquad \text{(Equation 1)}$$

As illustrated in Equation 1, using A2 for the calculation of the distance L to the object reduces adverse effect brought by, for example, background light and dark current in the calculation of the distance L.

Figure 4B:
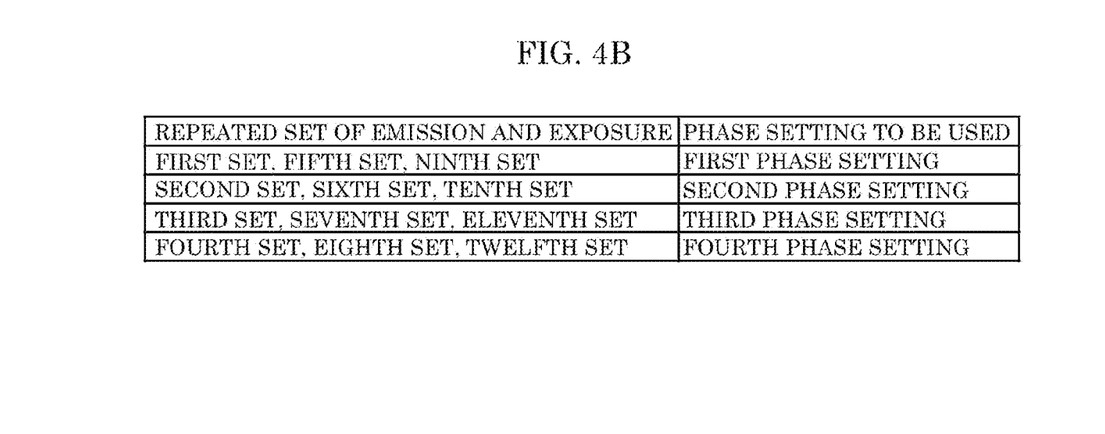
FIG. 4B is a correspondence table illustrating one example of correspondence between emission and exposure processing and phase settings.

FIG. 4B is a diagram illustrating one example of a table of correspondence indicating whether or not the emission signal and the exposure signal are outputted by use of any of the first to fourth phase settings illustrated in FIG. 3 in each of the twelve sets of emission and exposure processing.

As illustrated in FIG. 4B, controller 3 here outputs the emission signal and the exposure signal at timing set by the first phase setting in the first, fifth, and ninth sets of emission and exposure processing. Controller 3 outputs the emission signal and the exposure signal at timing set by the second phase setting in the second, sixth, and tenth sets of emission and exposure processing. Controller 3 outputs the emission signal and the exposure signal at timing set by the third phase setting in the third, seventh, and eleventh sets of emission and exposure processing. Controller 3 outputs the emission signal and the exposure signal at timing set by the fourth phase setting in the fourth, eighth, and twelfth sets of emission and exposure processing.

As described above, in each set of the emission and exposure processing, while the relative phase relation between the outputting timing of the emission signal and the output timing of the exposure signal is maintained, the delay clocks used for the purpose of generating the emission signal and the exposure signal and outputted from variable delay circuit 32 differ from each other. Thus, it is possible to reduce a variation between A0, A1, and A2 due to a shift of the pulse width of the emission signal, a shift of the pulse width of the exposure signal, and a shift of the phase relation between the emission signal and the exposure signal, which are attributable to a delay difference between delay elements 31 forming variable delay circuit 32. Consequently, distance-measuring imaging device 10 can suppress deterioration in the distance measurement accuracy.

Note that which of the first to fourth phase settings illustrated in FIG. 3 is to be used in each of the 12 sets of emission and exposure processing may be randomly determined.

Moreover, in each set of the emission and exposure processing in the operation of imaging one frame, while an operation of imaging one frame described above by use of any one of the first to fourth phase settings illustrated in FIG. 3 is performed, the phase setting used may be determined for each of operations of imaging mutually different frames.

Next, a configuration of distance-measuring imaging device 10 will be described in more detail.

Figure 5:
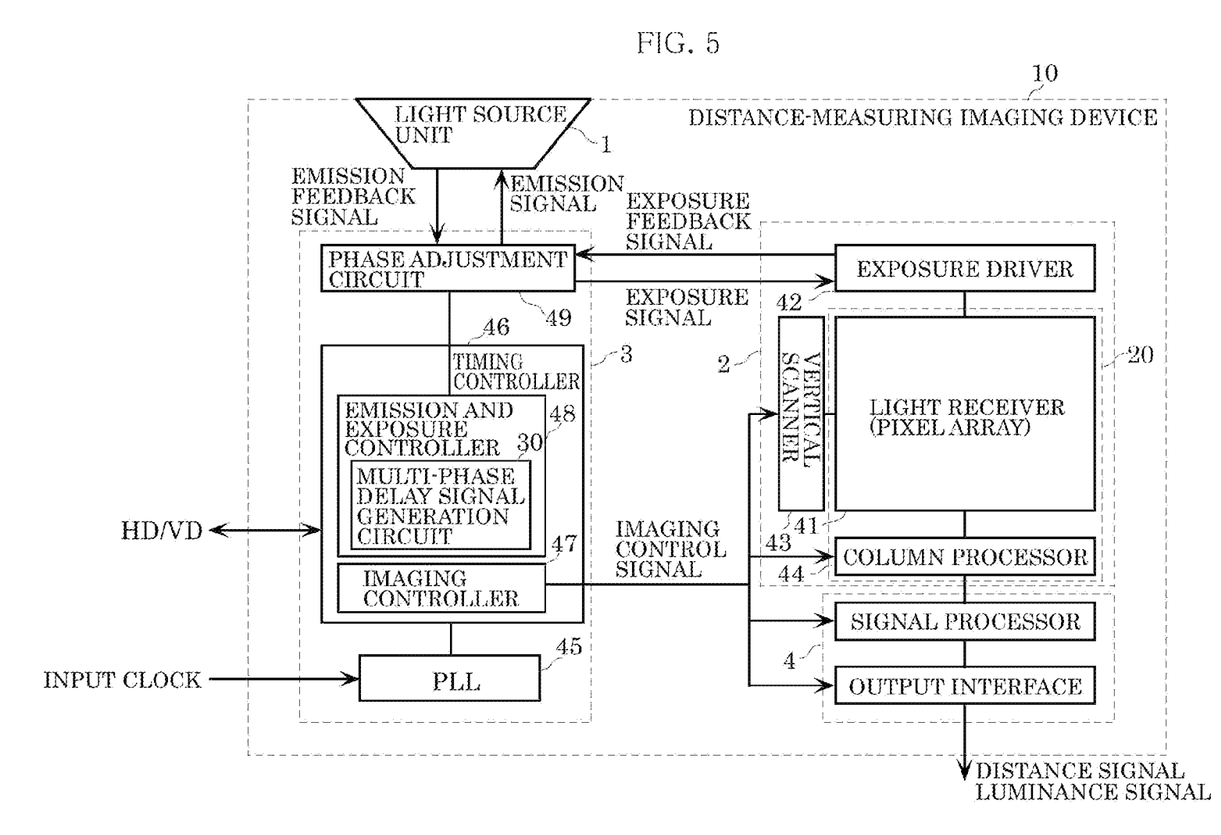
FIG. 5 is a functional block diagram illustrating one example of a configuration of a distance-measuring imaging device according to the embodiment.

FIG. 5 is a functional block diagram illustrating one example of a more detailed configuration of distance-measuring imaging device 10.

As illustrated in FIG. 5, controller 3 includes PLL 45, timing controller 46, and phase adjustment circuit 49. Timing controller 46 includes imaging controller 47 and emission and exposure controller 48.

Imaging controller 47 generates an imaging control signal for controlling imaging unit 2 and calculator 4.

Emission and exposure controller 48 includes multi-phase delay signal generation circuit 30 and creates a signal for controlling the emission of light source unit 1 and the exposure of imaging unit 2.

Imaging unit 2 includes light receiver 41, exposure driver 42, vertical scanner 43, and column processor 44. Here, light receiver 41 and column processor 44 are included in solid-state imaging element 20.

Light receiver 41 includes a pixel array composed of a plurality of pixels arranged in a matrix. Here, as described above, each pixel is formed of a plurality of signal storage regions where signal electric charges indicating an exposure amount are accumulated. The signal storage region may be realized by use of, for example, various types of analog memories such as a capacitor with a metal insulator metal (MIM) structure or may be realized by use of a vertical transfer channel to be described later on.

Exposure driver 42 performs exposure driving control on light receiver 41 in accordance with the timing indicated by the exposure signal generated by controller 3.

Vertical scanner 43 reads out the signal electric charges accumulated in light receiver 41 for each column and controls the operation of sequentially transmitting the read signal electric charges to column processor 44.

Column processor 44 receives the signal electric charges transmitted from light receiver 41 for each column and generates an imaging signal.

PLL 45 divides and multiplies the input clock as appropriate to generate a basic clock and distributes the clock to imaging controller 47 and emission and exposure controller 48.

Emission and exposure controller 48 includes multi-phase delay signal generation circuit 30 and generates an emission reference signal and an exposure reference signal based on the basic clocks distributed from PLL 45 and outputs the aforementioned signals to phase adjustment circuit 49.

Phase adjustment circuit 49 compares the phases of the emission reference signal and an emission feedback signal provided from light source unit 1 and adjusts the phase of the emission reference signal to generate an emission signal. The emission feedback signal here is a signal indicating that light source unit 1 has performed light emission. The emission feedback signal may be a cathode signal of a light-emitting diode, for example, in a case where the light-emitting element of light source unit 1 is a light-emitting diode.

Moreover, phase adjustment circuit 49 compares the phases of the exposure reference signal and an exposure feedback signal provided from exposure driver 42 and adjusts the phase of the exposure reference signal to generate an exposure signal. The exposure feedback signal here is a signal indicating that exposure driver 42 has performed exposure driving of light receiver 41. For example, in a case where exposure driver 42 has a driver which outputs a signal for performing the exposure driving of light receiver 41, the exposure feedback signal may be an output signal of the aforementioned driver.

Consequently, it is possible to suppress the distance measurement difference due to the phase difference between the emission driving of light source unit 1 and the exposure driving of imaging unit 2 attributable to the delay variation, the temperature variation, and deterioration over time in multi-phase delay signal generation circuit 30 which generates the emission reference signal and the exposure reference signal. It is also possible to actively compensate the distance measurement difference attributable to the phase difference between the emission driving of the light source and the exposure driving of the imaging unit following a state change of distance-measuring imaging device 10 due to the temperature and the time passage.

Light source unit 1 performs light emission a plurality of times in accordance with the emission signal repeatedly outputted by controller 3, as described above.

Under the control of light receiver 41 by exposure driver 42, imaging unit 2 performs exposure a plurality of times in accordance with the exposure signal repeatedly outputted by controller 3 and stores the signal electric charges in the plurality of different signal storage regions for the respective pixels to thereby perform imaging. Then in accordance with an imaging control signal provided from imaging controller 47, vertical scanner 43 reads, for each column, the signal electric charges accumulated in light receiver 41 and sequentially transmits the read signal electric charges to column processor 44. Then, column processor 44 receives the signal electric charges and performs correlated double sampling (CDS) to generate a pixel signal, further converts the generated pixel signal into a digital signal by the A/D converter for each column, and performs horizontal scanning and outputs, to calculator 4, the pixel signal converted into the digital signal.

Calculator 4 generates a distance signal and a luminance signal through calculation performed at a signal processor based on the imaging signal generated by imaging unit 2 and outputs the generated distance signal and luminance signal from an output interface.

Next, one example of phase adjustment circuit 49 will be described.

Figure 6:
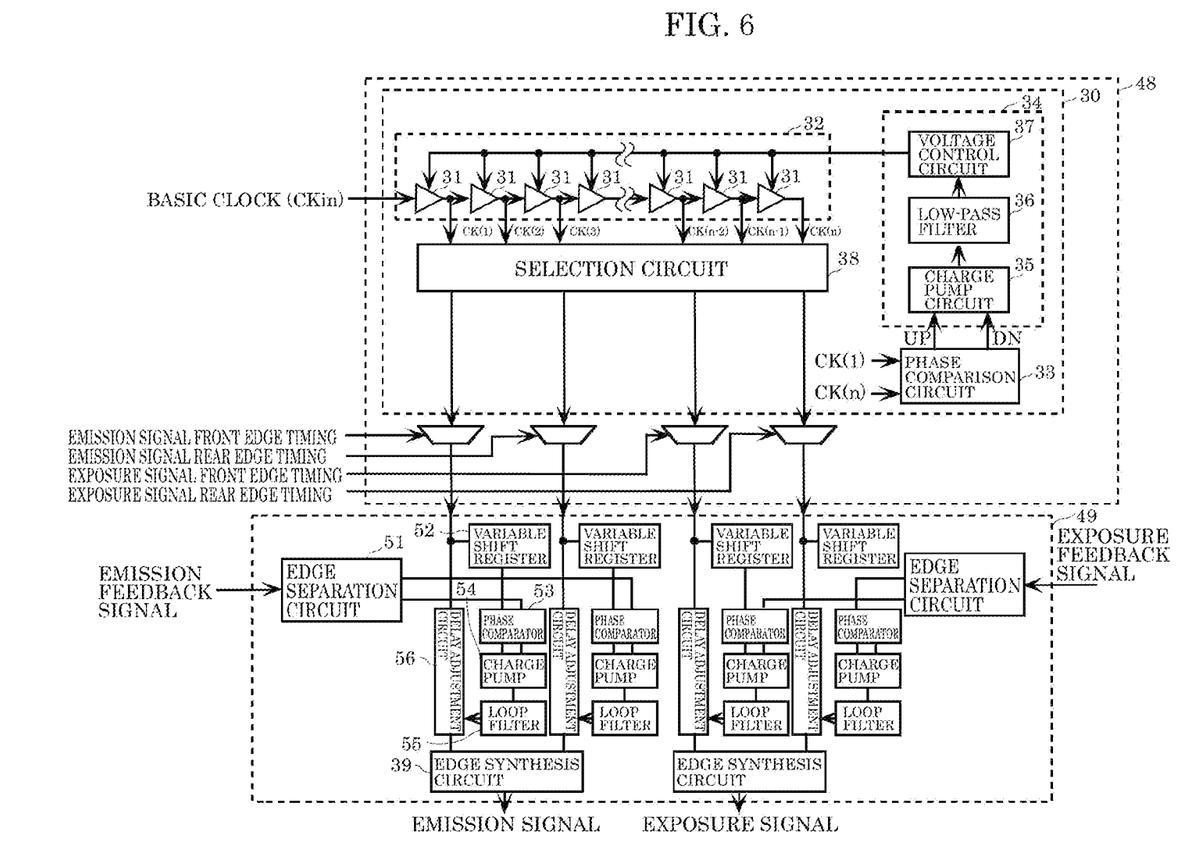
FIG. 6 is a block diagram illustrating one example of a configuration of a phase adjustment circuit according to the embodiment.

FIG. 6 is a block diagram illustrating one example of a configuration of phase adjustment circuit 49.

As illustrated in FIG. 6, phase adjustment circuit 49 includes a plurality of edge separation circuits 51, a plurality of variable shift registers 52, a plurality of phase comparators 53, a plurality of charge pumps 54, a plurality of loop filters 55, a plurality of delay adjustment circuits 56, and a plurality of edge synthesis circuits 39.

The emission reference signal and the exposure reference signal outputted from emission and exposure controller 48 are inputted to phase comparator 53 via delay adjustment circuit 56 and variable shift register 52, respectively.

In variable shift register 52, a shift amount of the emission reference signal or the exposure reference signal is set in accordance with the delay amount of the emission signal in the driving circuit of light source unit 1 or the delay amount of exposure driver 42 of imaging unit 2 so that a maximum phase difference in phase comparators 53 is within a delay adjustable range of delay adjustment circuit 56.

On the other hand, the emission feedback signal from light source unit 1 and the exposure feedback signal from exposure driver 42 of imaging unit 2 are respectively separated to the front edge and the rear edge at edge separation circuit 51 and each inputted to phase comparator 53.

In phase comparator 53, phase comparison is performed: between the front edge of the emission reference signal and the front edge of the emission feedback signal; between the rear edge of the emission reference signal and the rear edge of the emission feedback signal; between the front edge of the exposure reference signal and the front edge of the exposure feedback signal; and between the rear edge of the exposure reference signal and the rear edge of the exposure feedback signal. Based on results of the phase comparison, the charge signal or the discharge signal is outputted to charge pump 54.

Charge pump 54 increases or decreases the output voltage outputted to loop filter 55 in response to the charge signal or the discharge signal provided from phase comparator 53 to change the delay adjustment voltage of delay adjustment circuit 56 and thereby adjust the delay amount of delay adjustment circuit 56 and provides feedback so as to constantly provide no phase difference in phase comparator 53. Consequently, the phases of the front edge of the emission reference signal, the rear edge of the emission reference signal, the front edge of the exposure reference signal, and the rear edge of the exposure reference signal are adjusted. The front edge of the emission reference signal and the rear edge of the emission reference signal whose phases have been adjusted are synthesized at edge synthesis circuit 39 and outputted as an emission signal to light source unit 1. The front edge of the exposure reference signal and the rear edge of the exposure reference signal whose phases have been adjusted are synthesized at edge synthesis circuit 39 and outputted as an exposure signal to imaging unit 2.

Consequently, it is possible to suppress a distance measurement difference due to a shift of the pulse width of the emission signal and the exposure signal and a shift of phase relation attributable to variation in the delay difference between delay elements 31 forming variable delay circuit 32, the temperature change, and deterioration over time. It is also possible to actively compensate the distance measurement difference caused by the phase difference between the emission driving of the light source and the exposure driving of the imaging unit following a state change of the camera due to a temperature and time passage.

Next, one example of solid-state imaging element 20 will be described.

Figure 7A:
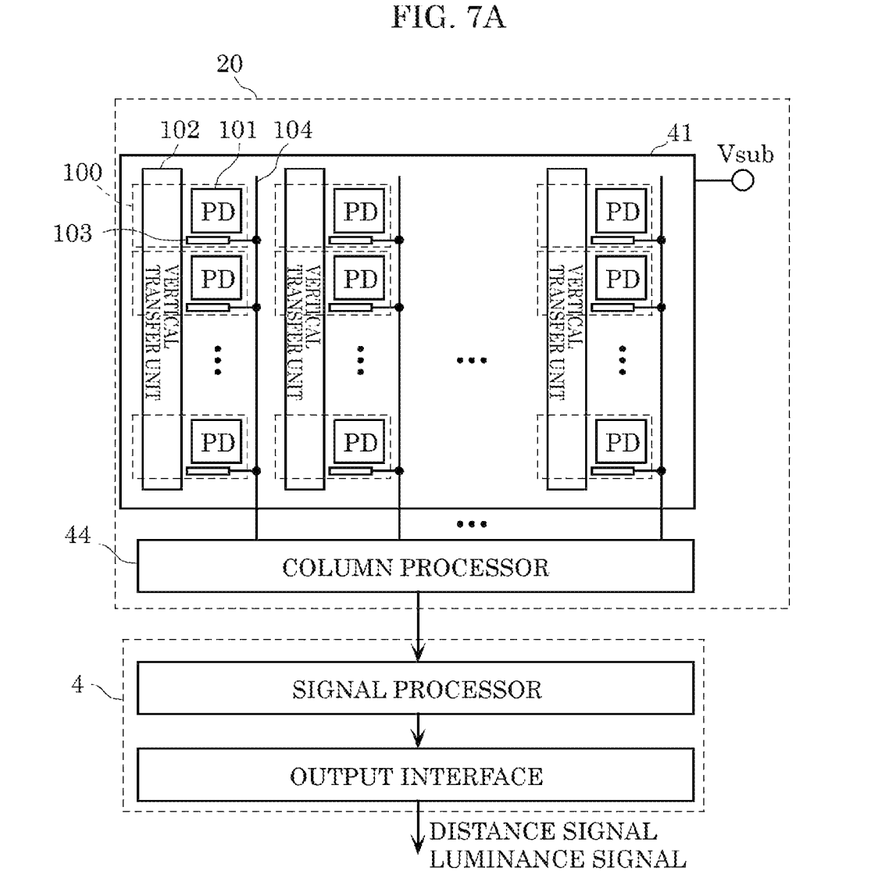
FIG. 7A is a block diagram illustrating one example of a configuration of a solid-state imaging element according to the embodiment.

FIG. 7A is a block diagram illustrating one example of a configuration of solid-state imaging element 20.

As illustrated in FIG. 7A, solid-state imaging element 20 includes light receiver 41 and column processor 44.

Light receiver 41 includes: a pixel array which is composed of a plurality of pixels 100 arranged in a matrix; vertical transfer unit 102 which is provided for each column of the pixel array; and vertical signal line 104 which is provided for each column of the pixel array.

Pixel 100 has photoelectric converter 101, a plurality of signal storage regions (not illustrated in FIG. 7A), and reader 103.

Photoelectric converter 101 is realized by, for example, a photodiode and converts received light into signal electric charges.

Each of the plurality of signal storage regions is a region which stores the signal electric charges resulting from the conversion by photoelectric converter 101 and is formed as a potential well in vertical transfer unit 102. The plurality of signal storage regions include at least a first signal storage region, a second signal storage region, and a third signal storage region. Specifically, at least three potential wells are formed for each pixel 100 in vertical transfer unit 102. The first signal storage region, the second signal storage region, and the third signal storage region of pixel 100 respectively store the signal electric charges generated at pixel 100 in the first emission and exposure processing, the signal electric charges generated at pixel 100 in the second emission and exposure processing, and the signal electric charges generated at pixel 100 in the third emission and exposure processing.

Reader 103 reads the signal electric charges stored in the specific signal storage region of the plurality of signal storage regions and coverts the signal electric charges into a voltage and outputs the voltage to vertical signal line 104.

Vertical transfer unit 102 includes a vertical transfer channel and a plurality of vertical transfer gates.

The plurality of vertical transfer gates are a plurality of types of vertical transfer electrodes which cover the vertical transfer channel. The plurality of potential wells are formed as a plurality of signal storage regions in the vertical transfer channel by a combination of voltages applied to the plurality of vertical transfer gates. Hereinafter, the potential wells will be called packets.

The aforementioned configuration of solid-state imaging element 20 refers to an example of a hybrid configuration having a combination of vertical transfer unit 102 included in a typical charge coupled device (CCD) image sensor and reader 103 and vertical signal line 104 included in a typical complementary metal oxide semiconductor (CMOS) image sensor. Note that the hybrid configuration of the CMOS image sensor and the CCD image sensor refers to a configuration including a combination of a configuration such that the voltage signal is selectively outputted to the vertical signal line, which is characteristic of the CMOS image sensor, and a configuration such that an electric charge transfer path is formed as a signal storage region for each pixel, which is characteristic of the CCD image sensor.

Next, a more detailed configuration example of pixel 100 will be described.

Figure 7B:
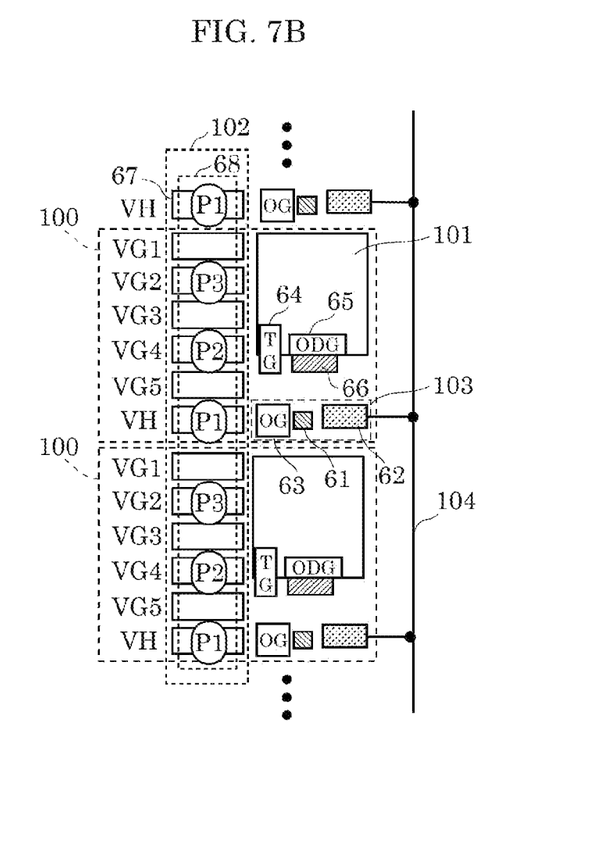
FIG. 7B is a block diagram illustrating one example of a configuration of pixels according to the embodiment.

FIG. 7B is a block diagram illustrating one example of the configuration of pixel 100.

As illustrated in FIG. 7B, pixel 100 includes first signal storage region P1, second signal storage region P2, third signal storage region P3, photoelectric converter 101, and reader 103. Photoelectric converter 101 is provided with reading gate 64, exposure control gate 65, and overflow drain 61. Reader 103 includes floating diffusion layer 61, reading circuit 62, and output control gate 63.

First signal storage region P1, second signal storage region P2, and third signal storage region P3 are each formed as a packet at a portion corresponding to pixel 100 of vertical transfer unit 102.

Each vertical transfer unit 102 has one vertical transfer channel 68 and six types of vertical transfer gates 67 per photoelectric converter 101. The six types of vertical transfer gates 67 are also respectively referred to as vertical transfer gate VG1, vertical transfer gate VG2, vertical transfer gate VG3, vertical transfer gate VG4, vertical transfer gate VG5, and vertical transfer gate VH.

More specifically, each of first signal storage region P1, second signal storage region P2, and third signal storage region P3 is formed as a packet in vertical transfer channel 68 in accordance with a combination of voltages applied to the plurality of vertical transfer gates 67.

In FIG. 7B, first signal storage region P1 is a packet formed by the vertical transfer gate VH, second signal storage region P2 is a packet formed by vertical transfer gate VG4, and third signal storage region P3 is a packet formed by vertical transfer gate VG2. Note that, however, the respective positions of first signal storage region P1, second signal storage region P2, and third signal storage region P3 are not fixed but vertically move following the vertical transfer of the signal electric charges in a forward direction or a reverse direction.

Reading gate 64 is a gate electrode which transfers, to vertical transfer unit 102, the signal electric charges resulting from the conversion by photoelectric converter 101 in accordance with the voltage applied to reading gate 64. More specifically, reading gate 64 transfers the signal electric charges resulting from the conversion by photoelectric converter 101 to the packet formed by vertical transfer gate VG4.

Exposure control gate 65 controls the exposure of photoelectric converter 101 in accordance with the voltage applied to exposure control gate 65. For example, an exposure control signal having an active low (that is, negative logic) pulse is inputted to exposure control gate 65. For example, when the exposure control signal is at a high level, exposure control gate 65 discharges the signal electric charges of photoelectric converter 101 to overflow drain 66 to invalidate the photoelectric conversion performed by photoelectric converter 101. That is, exposure control gate 65 clears photoelectric converter 101 to turn photoelectric converter 101 into a non-exposed state. Moreover, for example, when the exposure control signal is at a low level, exposure control gate 65 turns photoelectric converter 101 into an exposed state in which the signal electric charges are generated in accordance with the amount of light received. During a period in which exposure control signal is at a low level, if photoelectric converter 101 is at an exposed state and reading gate 64 is open (the voltage applied to reading gate 64 is at a high level), the signal electric charges resulting from the conversion by photoelectric converter 101 are transferred to and stored into the packet formed by vertical transfer gate VG4 via reading gate 64.

Overflow drain 66 is a region for discharging the signal electric charges of photoelectric converter 101 in a depth direction (that is, to the rear side) of a semiconductor substrate.

Output control gate 63 is a gate electrode for transferring the signal electric charges of the packet formed by the vertical transfer gate VH to floating diffusion layer 61.

Floating diffusion layer 61 coverts, into a voltage, the signal electric charges transferred from the packet formed by the vertical transfer gate VH via output control gate 63.

Reading circuit 62 outputs a signal converted into the voltage at floating diffusion layer 61 to vertical signal line 104. Reading circuit 62 has, for example, a selection transistor and an amplification transistor. The amplification transistor forms a source follower circuit together with a loading circuit connected to vertical signal line 104.

The aforementioned configuration makes it possible for solid-state imaging element 20 to simultaneously realize the speed-up through the column processing operation and provide a low dark current by use of the vertical transfer channel for the signal storage region, which makes it possible to accurately measure the distance of an object which moves at a high speed.

Note that described herein is that solid-state imaging element 20 has, as one example, the hybrid configuration having a combination of vertical transfer unit 102 included in the typical CCD image sensor and reader 103 and vertical signal line 104 included in the typical CMOS image sensor. However, solid-state imaging element 20 is not necessarily limited to the aforementioned example of the hybrid configuration and may have another configuration. Solid-state imaging element 20 may be realized by, for example, the CCD image sensor, the CMOS image sensor, or an image sensor including a photoelectric conversion film.

Hereinafter, distance-measuring imaging device 10 with the aforementioned configuration will be discussed.

As described above, with the aforementioned configuration, distance-measuring imaging device 10 can reduce a variation between the sum A0 of the amount of exposure performed by the first emission and exposure processing, the sum A1 of the amount of exposure performed by the second emission and exposure processing, and the sum A2 of the amount of exposure performed by the third emission and exposure processing, which is attributable to the phase difference between the emission timing and the exposure timing. Then distance-measuring imaging device 10 uses the A0, A1, and A2, the variation of which has been reduced, to calculate a distance L to the object. Therefore, distance-measuring imaging device 10 can suppress deterioration in the distance measurement accuracy attributable to the phase difference between the emission timing and the exposure timing.

The distance-measuring imaging device and the solid-state imaging element according to the present disclosure have been described above based on the embodiment, but the present disclosure is not limited to the embodiment. The present disclosure also includes: another embodiment realized by combining together the desired components in the embodiment; a variation obtained by making various modifications conceivable by those skilled in the art to the embodiment within a range not departing from the spirits of the present disclosure; and various devices having the distance-measuring imaging device and solid-state imaging element according to the present disclosure built therein.

Although only some exemplary embodiment of the present disclosure has been described in detail above, those skilled in the art will readily appreciate that many modifications are possible in the exemplary embodiment without materially departing from the novel teachings and advantages of the present disclosure. Accordingly, all such modifications are intended to be included within the scope of the present disclosure.

INDUSTRIAL APPLICABILITY

The distance-measuring imaging device and solid-state imaging element according to the present disclosure are widely applicable to, for example, imaging devices which image an object.

What is claimed is:

1. A distance-measuring imaging device, comprising:
a controller which repeatedly performs outputting of an emission signal instructing light emission and outputting of an exposure signal instructing exposure;
a light source unit which performs light emission a plurality of times in accordance with the emission signal repeatedly outputted by the controller; and
an imaging unit which includes a solid-state imaging element which performs exposure a plurality of times in accordance with the exposure signal repeatedly outputted by the controller, the imaging unit generating an imaging signal through the exposure performed the plurality of times, wherein
the controller includes a multi-phase delay signal generation circuit which generates a plurality of delay clocks having mutually different phases, and uses the plurality of delay clocks to repeatedly perform the outputting of the emission signal and the outputting of the exposure signal,
the controller
updates a phase setting sequentially used from among two or more phase settings for setting a phase difference between output timing of the emission signal and output timing of the exposure signal with reference to a basic clock;

maintains a relative phase relation between the outputting timing of the emission signal and the outputting timing of the exposure signal in repeatedly performing the outputting of the emission signal and the outputting of the exposure signal a plurality of times, and further updates, from among the two or more phase settings having the relative phase relation that is identical, the phase setting sequentially used.

2. The distance-measuring imaging device according to claim 1, wherein where the two or more phase settings are respectively defined as first to k-th phase settings in ascending order of a phase difference between the basic clock and the outputting timing of the exposure signal where k is an integer of 2 or more, for the k desired, a phase difference between the outputting timing of the exposure signal in a k–1-th phase setting and the outputting timing of the exposure signal in the k-th phase setting is one k-th of one cycle of the basic clock.

3. The distance-measuring imaging device according to claim 1, wherein the controller uses one of the two or more phase settings to perform a first set of repeatedly performing the outputting of the emission signal and the outputting of the exposure signal a plurality of times, and uses another one of the two or more phase settings to perform a second set of repeatedly performing the outputting of the emission signal and the outputting of the exposure signal a plurality of times equal to the plurality of times which the first set is performed.

4. The distance-measuring imaging device according to claim 1, wherein the controller updates the phase setting sequentially used in one frame of an exposure period.

5. The distance-measuring imaging device according to claim 1, wherein the controller updates the phase setting sequentially used upon switching of exposure periods having mutually different frames.

6. The distance-measuring imaging device according to claim 1, wherein the multi-phase delay signal generation circuit is a DLL circuit.

7. The distance-measuring imaging device according to claim 6, wherein the multi-phase delay signal generation circuit includes:
a variable delay circuit which sequentially delays the basic clock and generates the plurality of delay clocks;
a phase comparison circuit which receives input of a first reference clock as any one of the plurality of delay clocks or the basic clock and a second reference clock as any one of the plurality of delay clocks a phase of which is behind a phase of the first reference clock, and compares the phase of the first reference clock and the phase of the second reference clock within one cycle of the basic clock based on voltage levels of the first reference clock and the second reference clock;
a delay control circuit which controls a delay amount in the sequential delaying of the basic clock in the variable delay circuit based on a result of comparison performed by the phase comparison circuit; and
a selection circuit which, from among the plurality of delay clocks generated by the variable delay circuit, selects and outputs one or more delay clocks.

8. The distance-measuring imaging device according to claim 1, further comprising:

a calculator which outputs a distance signal including information on a distance to a subject based on the imaging signal.

9. The distance-measuring imaging device according to claim 1, wherein the solid-state imaging element includes a pixel array including a plurality of pixels arranged in a matrix,
each of the plurality of pixels includes: a photoelectric converter which converts received light into electric charges; and a reading gate which reads the electric charges resulting from the conversion by the photoelectric converter, and
the pixel array includes, for each column, a vertical transfer unit which transfers, in a direction along the column, the electric charges read by the reading gate.

10. A solid-state imaging element which is included in an imaging unit of a distance-measuring imaging device including: a controller, a light source unit, and the imaging unit, the solid-state imaging element performing exposure a plurality of times in accordance with an exposure signal repeatedly outputted by the controller, wherein the controller repeatedly performs outputting of an emission signal instructing light emission and outputting of an exposure signal instructing exposure, includes a multi-phase signal generation circuit which generates a plurality of delay clocks having mutually different phases, and uses the plurality of delay clocks to repeatedly perform the outputting of the emission signal and the outputting of the exposure signal, the light source unit performs light emission a plurality of times in accordance with the emission signal repeatedly outputted by the controller;

the imaging unit generates an imaging signal, and the controller:

updates a phase setting sequentially used from among two or more phase settings for setting a phase difference between output timing of the emission signal and output timing of the exposure signal with reference to a basic clock;

maintains a relative phase relation between the outputting timing of the emission signal and the outputting timing of the exposure signal in repeatedly performing the outputting of the emission signal and the outputting of the exposure signal a plurality of times; and updates, from among the two or more phase settings having the relative phase relation that is identical, the phase setting sequentially used.

* * * * *